United States Patent
Saetveit

(10) Patent No.: US 11,125,662 B1
(45) Date of Patent: Sep. 21, 2021

(54) AUTO-SAMPLING SYSTEM WITH AUTOMATIC MATRIX MATCHING CAPABILITY

(71) Applicant: Elemental Scientific, Inc., Omaha, NE (US)

(72) Inventor: Nathan Saetveit, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 0 days.

(21) Appl. No.: 16/729,081

(22) Filed: Dec. 27, 2019

Related U.S. Application Data

(63) Continuation of application No. 15/012,971, filed on Feb. 2, 2016, now abandoned.

(60) Provisional application No. 62/110,741, filed on Feb. 2, 2015.

(51) Int. Cl.
*G01N 1/38* (2006.01)
*G01N 1/14* (2006.01)
*H01J 49/04* (2006.01)

(52) U.S. Cl.
CPC ............... *G01N 1/38* (2013.01); *G01N 1/14* (2013.01); *H01J 49/0445* (2013.01); *G01N 2001/386* (2013.01)

(58) Field of Classification Search
CPC ...... G01N 1/38; G01N 1/14; G01N 2001/386; H01J 49/0445
See application file for complete search history.

(56) References Cited

U.S. PATENT DOCUMENTS

| | | |
|---|---|---|
| 3,690,838 A | 9/1972 | Luckey et al. |
| 4,520,108 A | 5/1985 | Yoshida et al. |
| 5,411,866 A | 5/1995 | Luong et al. |
| 8,438,939 B1 * | 5/2013 | Wiederin ............ G01N 1/22 73/864.22 |
| 8,745,191 B2 | 6/2014 | Raleigh et al. |
| 8,748,191 B2 | 6/2014 | Kraus et al. |
| 8,925,375 B1 * | 1/2015 | Wiederin ............ G01N 1/38 73/61.55 |
| 2004/0002166 A1 * | 1/2004 | Wiederin ............ G01N 1/2202 436/181 |
| 2009/0068749 A1 | 3/2009 | Saini |
| 2009/0136978 A1 | 5/2009 | Kojima et al. |
| 2012/0304747 A1 * | 12/2012 | Van Berkel ............ G01N 1/38 73/61.59 |
| 2017/0281639 A1 | 10/2017 | Kawasaki et al. |

* cited by examiner

*Primary Examiner* — Peter J Macchiarolo
*Assistant Examiner* — Anthony W Megna Fuente
(74) *Attorney, Agent, or Firm* — Kevin E. West; Advent, LLP

(57) ABSTRACT

The present disclosure is directed to an auto-sampling system with syringe, valve configurations, and control logic that allow automatic, inline matrix matching of calibration standards to samples. In implementations, this accomplished with three independent syringes connected to a valve system to dynamically introduce carrier, diluent, and ultrapure stock matrix flows for each blank, standard, or sample.

8 Claims, 11 Drawing Sheets

AUTO-SAMPLING SYSTEM WITH AUTOMATIC MATRIX MATCHING CAPABILITY

CROSS-REFERENCE TO RELATED APPLICATIONS

The present application is a continuation under 35 U.S.C. § 120 of U.S. patent application Ser. No. 15/012,971, filed Feb. 2, 2016, and titled "AUTO-SAMPLING SYSTEM WITH AUTOMATIC MATRIX MATCHING CAPABILITY," which in turn claims priority under 35 U.S.C. § 119(e) to U.S. Provisional Application Ser. No. 62/110,741, filed Feb. 2, 2015 and titled "AUTO-SAMPLING SYSTEM WITH AUTOMATIC MATRIX MATCHING CAPABILITY." U.S. Provisional Application Ser. No. 62/110,741 and U.S. patent application Ser. No. 15/012,971 are each incorporated herein by reference in its entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. Prior or during transportation of the aliquot to the nebulizer, the sample aliquot may be mixed with hydride generation reagents and fed into a hydride gas/liquid separator that channels hydride and/or sample gas into the nebulizer. The aerosol generated by the nebulizer is then sorted in a spray chamber to remove the larger aerosol particles. Upon leaving the spray chamber, the aerosol is introduced into the plasma by a plasma torch assembly of the ICP-MS or ICP-AES instruments for analysis.

Matrix effects from high total dissolved solids (TDS) in samples can cause severe problems for accurate determination of many elements by inductively coupled plasma (ICP) mass or optical emission spectrometry. High dilution factors attenuate the matrix effects but are undesirable if excellent detection limits are required. However, matching matrix of calibration standards to that of samples can be used to achieve very accurate results in high TDS samples with lower dilution or no dilution.

SUMMARY

The present disclosure is directed to an auto-sampling system with syringe, valve, and control logic configurations that allow automatic, inline matrix matching of calibration standards to samples. In some embodiments, the system includes a first syringe configured to drive a carrier solution, a second syringe configured to drive a diluent, a third syringe configured to drive a matrix solution, and a plurality of selection valves fluidically coupled with the first, second, and third syringes. The selection valves (e.g., automated selection/selector valves) can be controlled by a computing system to direct fluid flows from the first, second, and third syringes according to one or more modes of operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1A:
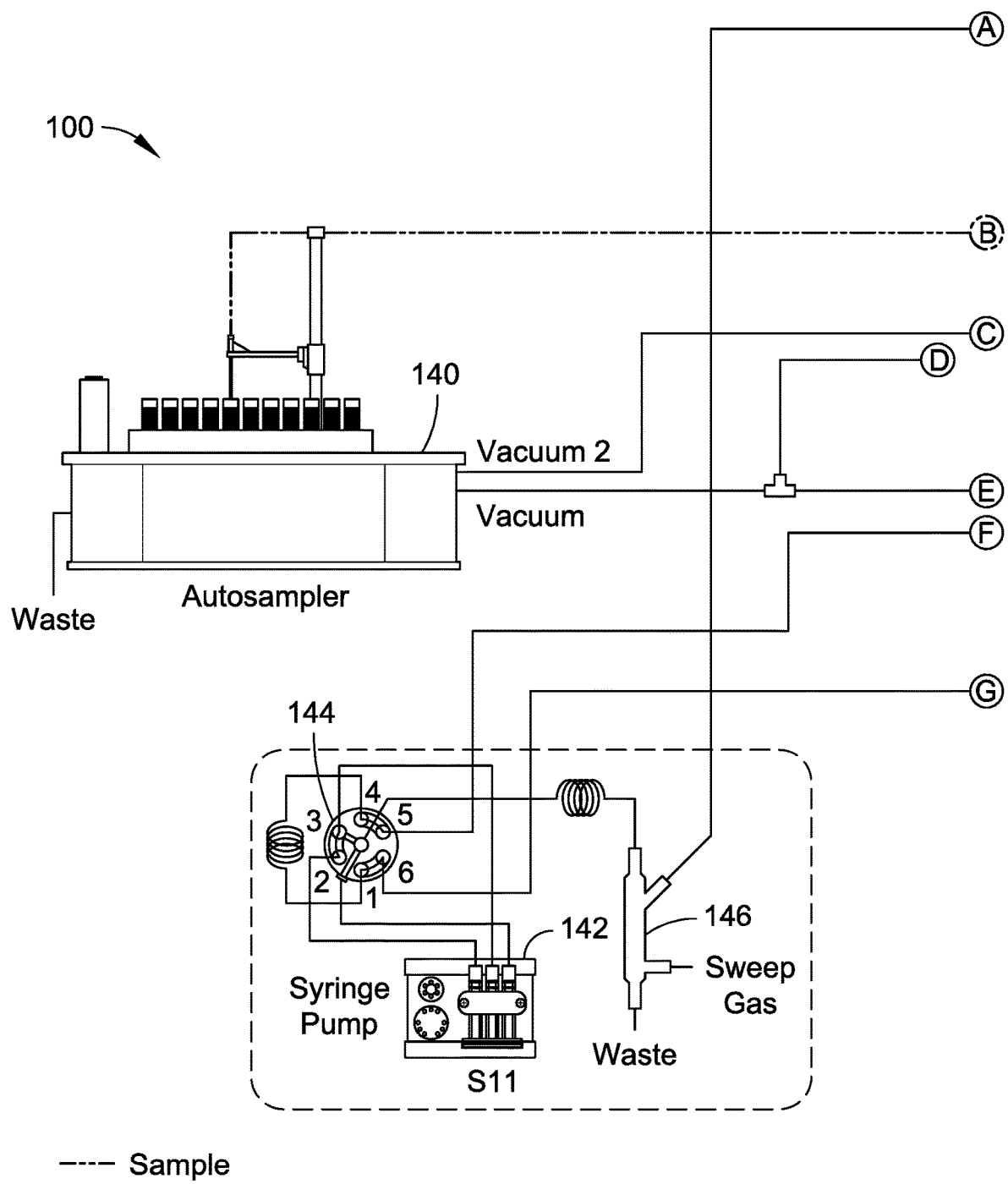
FIGS. 1A and 1B are schematics of an auto-sampling system operating in a sample loading mode, in accordance with an embodiment of this disclosure.
Figure 1B:
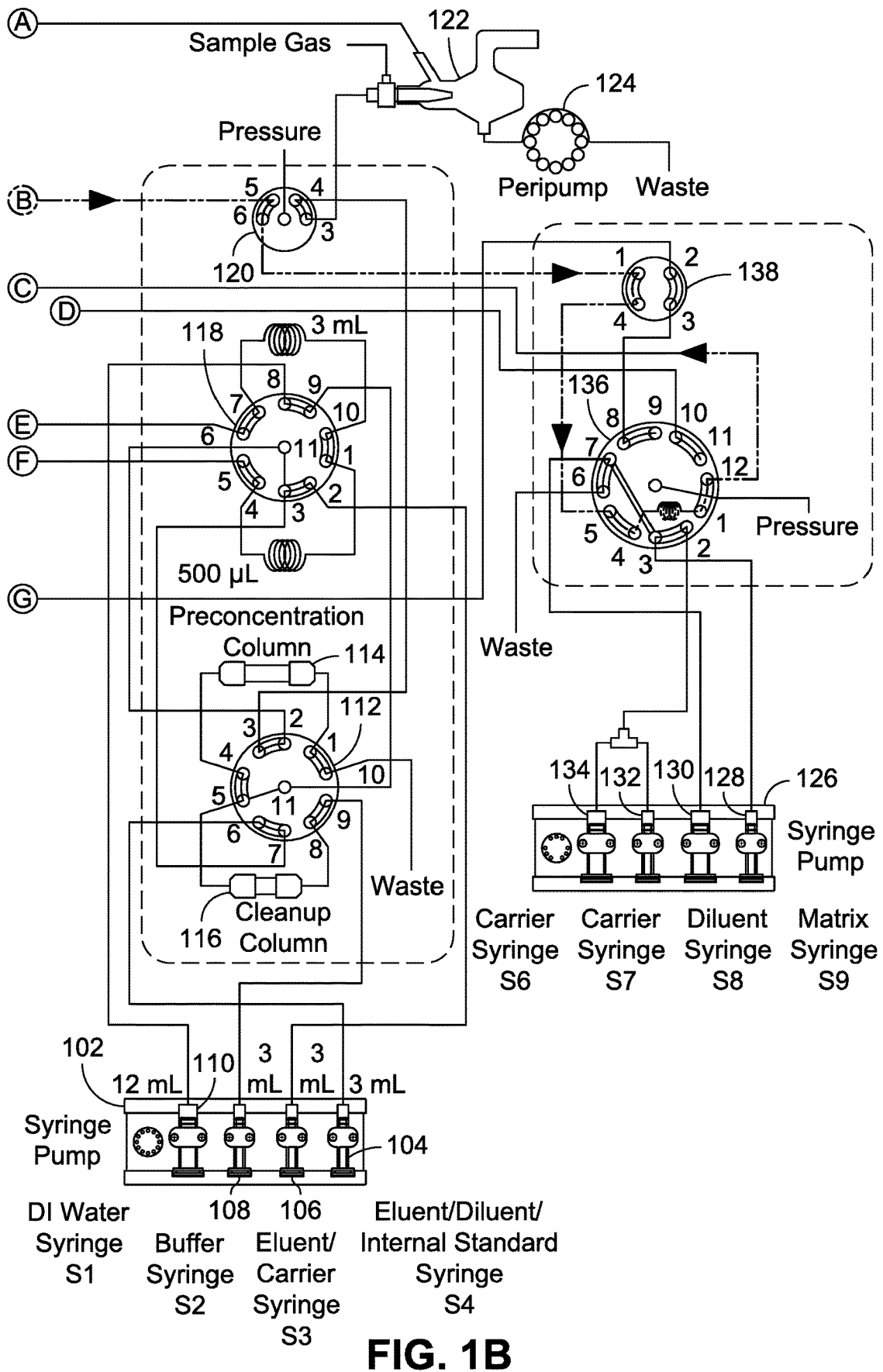
Figure 2A:
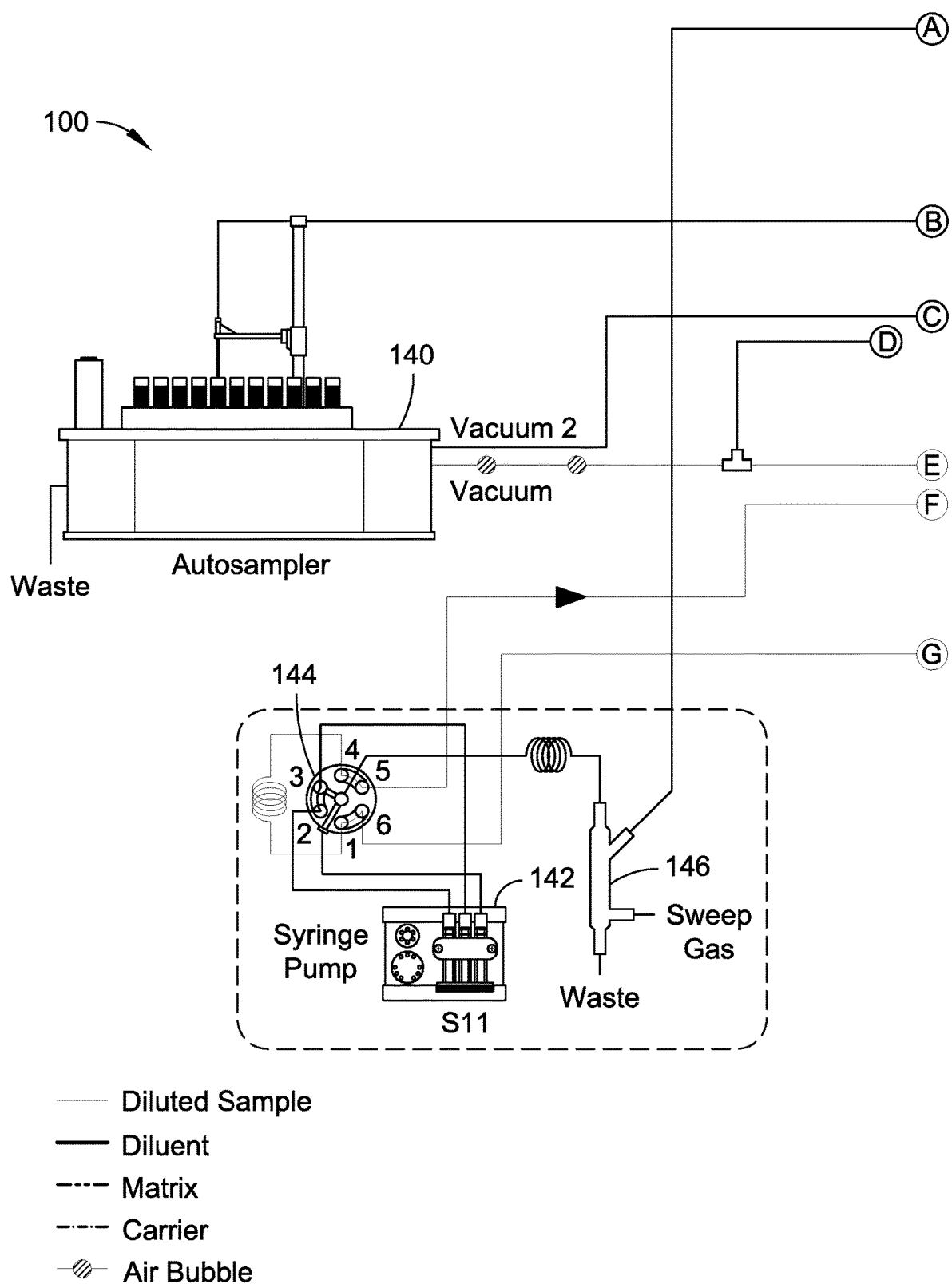
FIGS. 2A and 2B are schematics of an auto-sampling system operating in a sample dilution, matrix matching mode, in accordance with an embodiment of this disclosure.
Figure 2B:
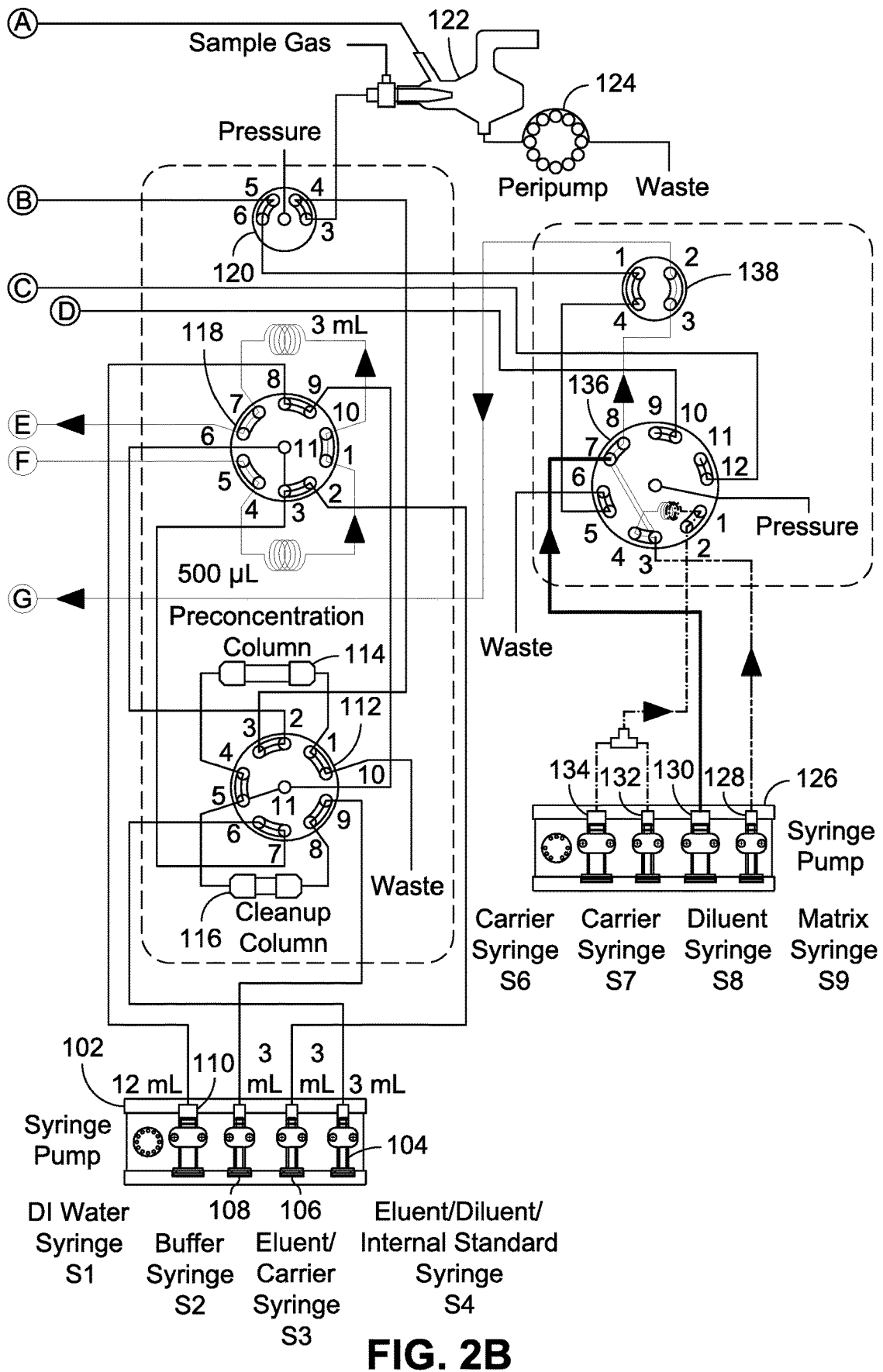
Figure 3A:
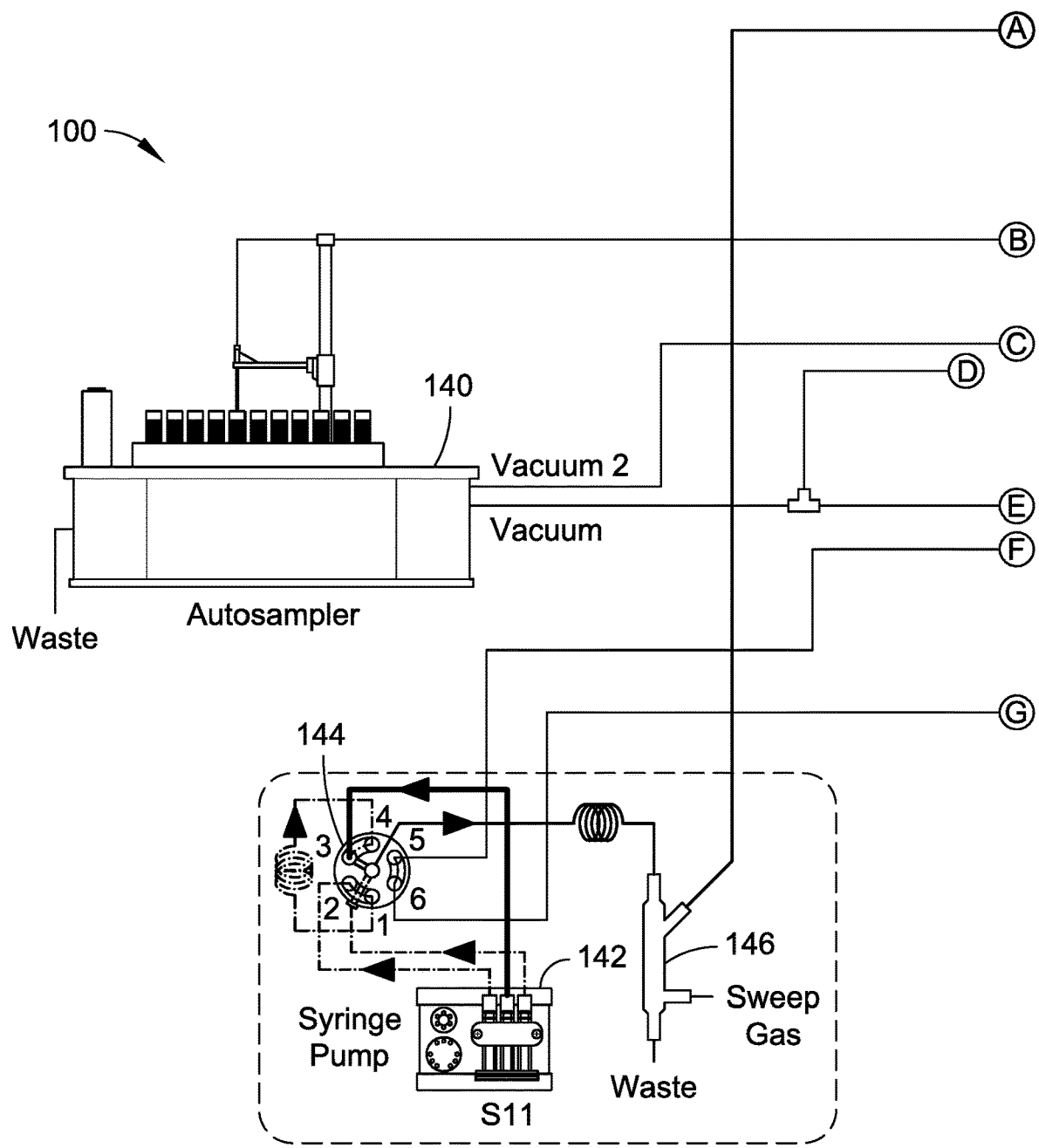
FIGS. 3A and 3B are schematics of an auto-sampling system operating in a hydride and/or direct dilution mode and/or pre-concentration column loading and matrix removal, in accordance with an embodiment of this disclosure.
Figure 3B:
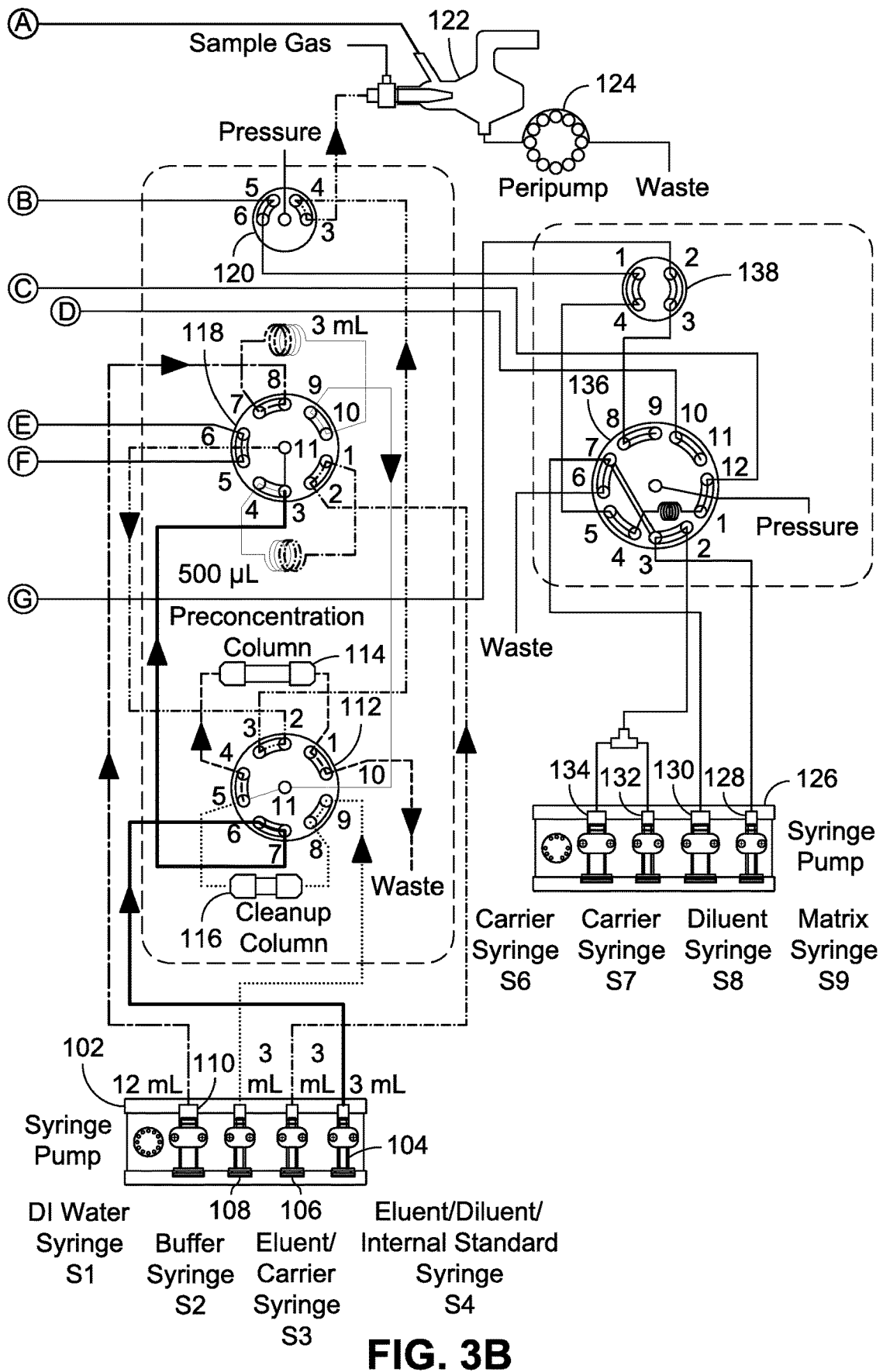
Figure 4A:
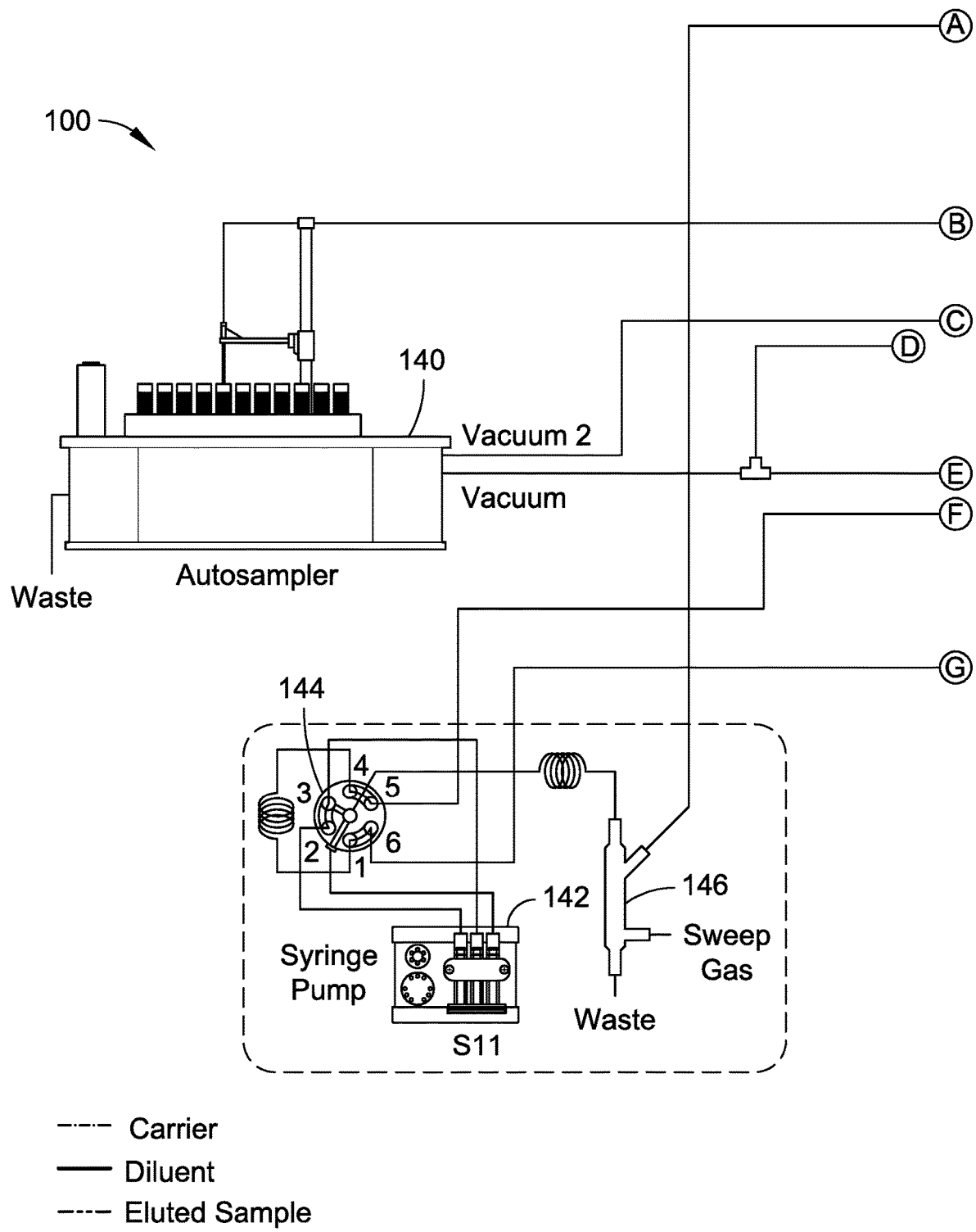
FIGS. 4A and 4B are schematics of an auto-sampling system operating in a pre-concentration mode for analyte elution and column cleaning, in accordance with an embodiment of this disclosure.
Figure 4B:
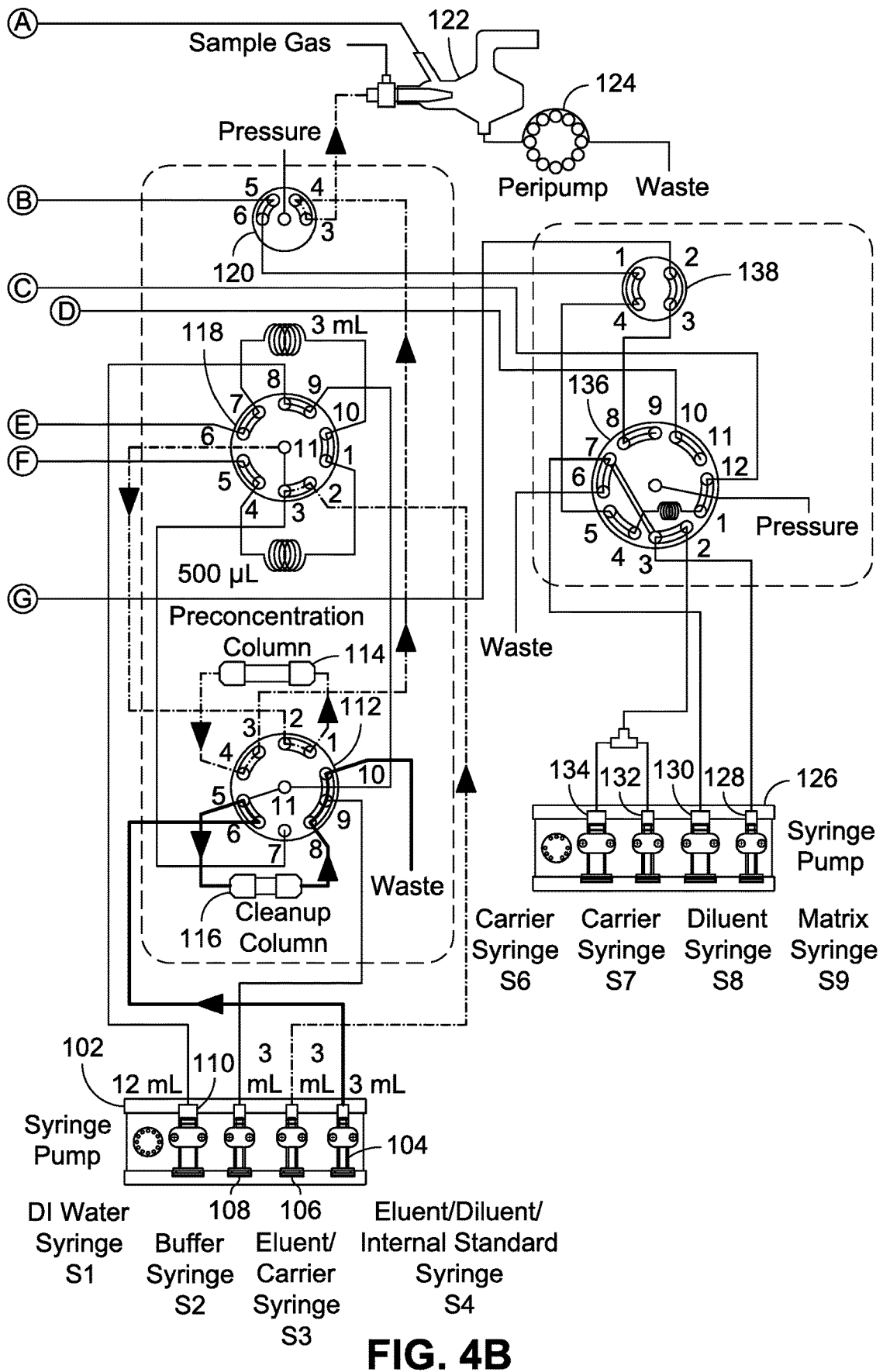

Matching matrix of calibration standards to that of samples has been used to achieve very accurate results in high TDS samples with lower dilution or no dilution. Traditionally, this is done by manually adding a clean matrix to the calibration blank, standards, and quality control (QC) samples.

An auto-sampling system is disclosed with syringe, valve, and control logic configurations that allow automatic, inline matrix matching of calibration standards to samples. This can be accomplished with three independent syringes connected to a valve system to dynamically introduce carrier, diluent, and ultrapure stock matrix flows for each blank, standard, or sample, as discussed in further detail below.

Example Implementations

FIGS. 1A through 5B illustrate an auto-sampling system 100 in accordance with various embodiments of this disclosure, wherein the auto-sampling system 100 includes syringe, valve, and control logic configurations that allow automatic, inline matrix matching of calibration standards to samples. Those skilled in the art will appreciate that the embodiments illustrated in the drawings and/or described herein may be modified or fully or partially combined to result in additional embodiments. Accordingly, the illustrated and described embodiments should be understood as explanatory and not as limitations of the present disclosure.

Figure 5A:
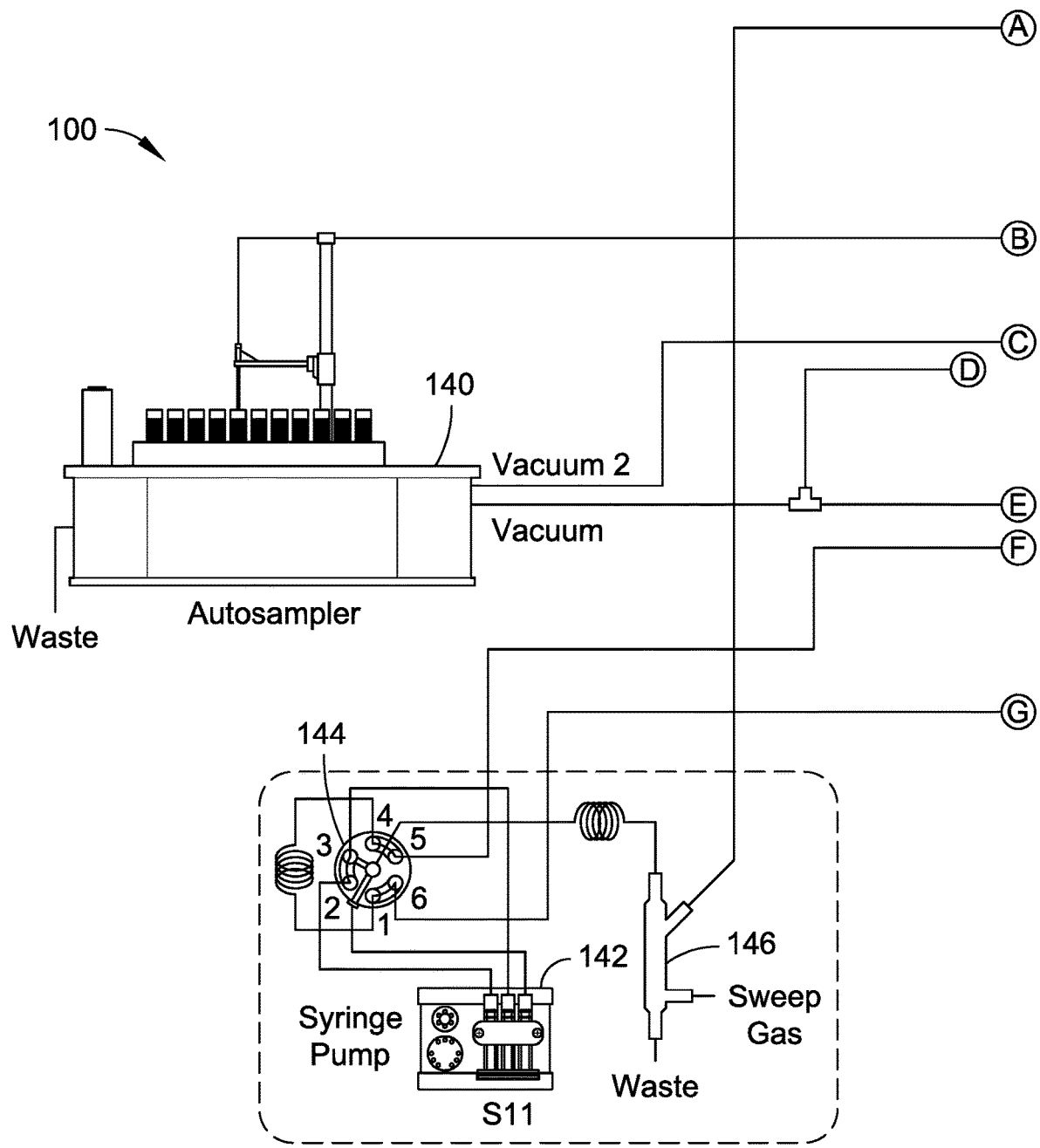
FIGS. 5A and 5B are schematics of an auto-sampling system operating in a column conditioning mode, in accordance with an embodiment of this disclosure.
Figure 5B:
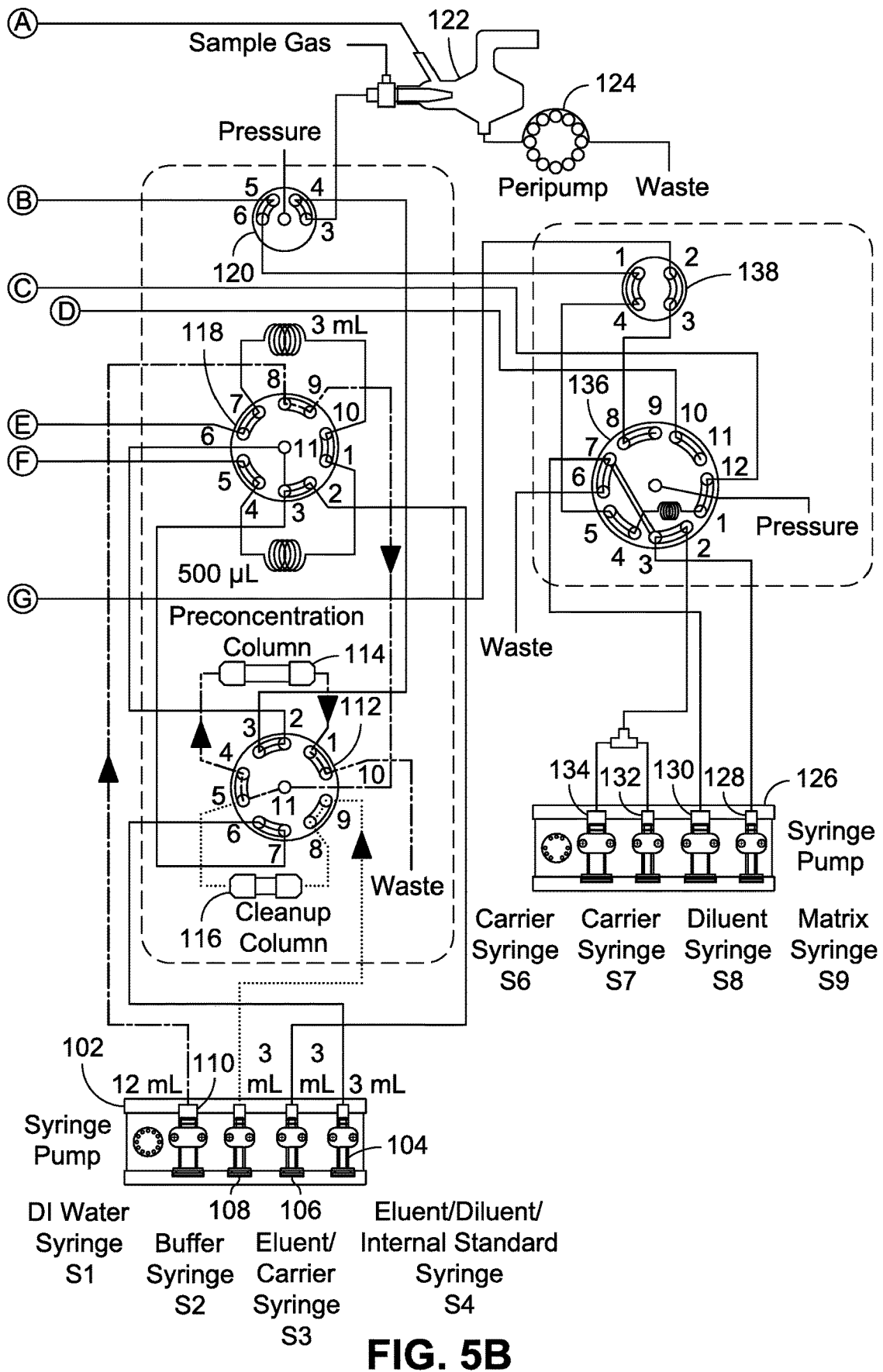

Example modes of operation are shown in FIGS. 1A through 5B. For example, FIGS. 1A and 1B illustrate the auto-sampling system 100 operating in a sample loading mode. FIGS. 2A and 2B illustrate the auto-sampling system 100 operating in a sample dilution, matrix matching mode. FIGS. 3A and 3B illustrate the auto-sampling system 100 operating in a hydride and/or direct dilution mode and/or pre-concentration column loading and matrix removal. FIGS. 4A and 4B illustrate the auto-sampling system 100 operating in a pre-concentration mode for analyte elution and column cleaning. FIGS. 5A and 5B illustrate the auto-sampling system 100 operating in a column conditioning mode.

In the embodiments illustrated in FIGS. 1A through 5B, the auto-sampling system 100 is shown to include a first syringe pump 102 that controls and/or physically supports a syringe 104 (e.g., a 3 mL syringe) configured to drive an eluent, diluent, or internal standard, a syringe 106 (e.g., a 3 mL syringe) configured to drive an eluent or a carrier, a syringe 108 (e.g., a 3 mL syringe) configured to drive a buffer, and a syringe 110 (e.g., a 12 mL syringe) configured to drive deionized (Di) water. In some embodiments, syringes 104, 106, 108, and 110 can be controlled by respective (independent) syringe pumps or at least one of syringes 104, 106, 108, and 110 can be controlled by a first pump, at least one of syringes 104, 106, 108, and 110 can be controlled by a second pump, and so forth. This applies to any other syringe pump configurations described herein.

Syringes 104 and 108 may be fluidically coupled to a selection valve 112 (e.g., an automated selection/selector valve), and syringes 106 and 110 may be fluidically coupled to another (second) selection valve 118. Selection valve 112 can also be coupled to a pre-concentration column 114, a trace metals cleanup column 116, a waste line and/or receptacle, selection valve 118, and another (third) selection valve 120. Selection valve 118 can also be coupled to a sampling device 140 and another selection valve 144. In embodiments, selection valve 144 is coupled to a hydride syringe pump 142 that can control syringes configured to drive hydride generation reagents (e.g., HCl and $NaBH_4$) and a carrier. Selection valve 144 can also be coupled with a gas/liquid separator 146 configured to isolate gaseous or aerosolized substances from the selection valve 144 and direct the gaseous or aerosolized substances to a spray chamber 122.

The spray chamber 122 is also configured to receive one or more sample substances from the sampling device 140 (e.g., automated sampling device), wherein the one or more sample substances can be received via selection valve 120, directly from the sampling device 140 or after the one or more sample substances have been directed through a mixing path defined by the network of selection valves. In some embodiments, a nebulizer is coupled to or included within the spray chamber 122 to aerosolize substances received from selection valve 120. The spray chamber 122 can also be coupled to a waste line and/or receptacle, where waste materials can be removed from the spray chamber by a pump 124 (e.g., peristaltic pump) coupled to the waste line. The spray chamber 122 can be included within or coupled to an analysis instrument, such as an ICP spectrometry instrument (e.g., ICP-MS, ICP-OES, ICP-AES, or the like). The spray chamber 216 may be configured to direct at least a portion of the one or more sample substances (e.g., gaseous or aerosolized sample substances) to an analysis site (e.g., torch or plasma site) of the analysis instrument.

In embodiments, the auto-sampling system 100 also includes syringe and valve configurations (and control logic, e.g., program instructions executable by a processor from a non-transitory computer readable carrier medium) that allow automatic, inline matrix matching of calibration standards to samples. For example, the system 100 includes another syringe pump 126 controlling a syringe 128 configured to drive a matrix solution, a syringe 130 configured to drive diluent, and one or more syringes 132 and/or 134 configured to drive carrier solution(s). Syringes 128, 130, 132, and 134 can be coupled to a selection valve 136. Selection valve 136 can also be coupled with a waste line and/or receptacle, a gas (e.g., Ar or $N_2$) source, another selection valve 138, and with the sampling device 140. Selection valve 138 may also be coupled with selection valve 120 (connecting to spray chamber 122) and with selection valve 144 (connecting to hydride syringe pump 142).

In some embodiments, the inline matrix matching is implemented by at least three independent syringes (i.e., syringes 128, 130, and 132 and/or 134) connected to a valve system (i.e., selection valve 136 and other fluidically coupled selection valves) to dynamically introduce carrier, diluent, and ultrapure stock matrix flows for each blank/standard/sample. Some example implementations include the following:

1) For "clean" stock calibration standard, blank, QC standards, or samples: Carrier+Matrix; Matrix flow rate set to achieve a pre-set final matrix concentration.
2) For samples that have matrix less than the pre-set matrix concentration, but more than "0" matrix: Carrier+Diluent+Matrix; Matrix addition is reduced as necessary.
3) For samples already containing at least the pre-set matrix concentration and analyzed undiluted: Carrier+Diluent. Diluent makes up the volume necessary to achieve the same total volume as condition #1.
4) For samples containing the pre-set matrix concentration but automatically diluted inline (which also dilutes the sample matrix): Same as condition #2.
5) For samples containing more than the pre-set matrix concentration, but automatically diluted inline (which also dilutes the sample matrix): Same as condition #2 OR condition #3.

This auto matrix matching functionality allows QC blanks and standards to be auto-calibrated and run from clean solutions (i.e., 1% nitric acid), while running real-world samples with high matrix. At the instrument (e.g., analysis instrument receiving one or more sample substances from spray chamber 122), all samples have a similar matrix composition, which allows more accurate quantification.

Figure 6:
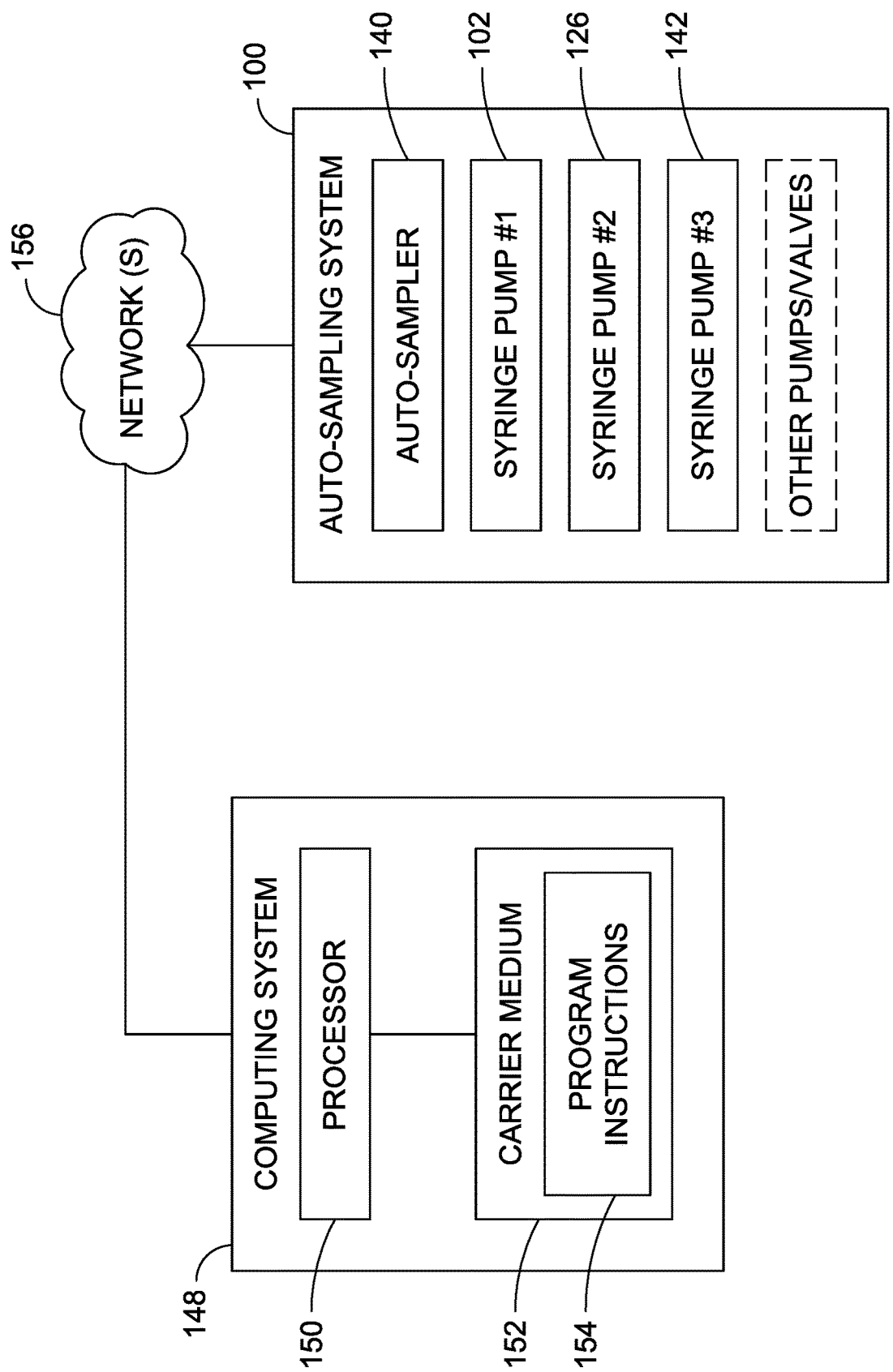
FIG. 6 is a block diagram illustrating a computing system for controlling an auto-sampling system, such as the auto-sampling system shown in FIGS. 1A through 5B.

Electromechanical devices (e.g., electrical motors, servos, actuators, or the like) may be coupled with or embedded within the selection valves to facilitate automated operation via control logic embedded within or externally driving the system 100. The electromechanical devices can be configured to cause the plurality of valves to direct fluid flows from syringes 128, 130, 132, and 134, and from other syringes, flow paths, etc., according to one or more modes of operation. As shown in FIG. 6, the auto-sampling system 100 may be controlled by a computing system 148 having a processor 150 configured to execute computer readable program instructions 154 (i.e., the control logic) from a non-transitory carrier medium 152 (e.g., storage medium such as a flash drive, hard disk drive, solid-state disk drive, SD card, optical disk, or the like). The computing system 148 can be connected to various components of the auto-sampling system 156, either by direct connection, or through one or more network connections (e.g., local area networking (LAN), wireless area networking (WAN or WLAN), one or more hub connections (e.g., USB hubs), and so forth). For example, the computing system 148 can be communicatively coupled to the sampling device 140, syringe pump 102, syringe pump 126, syringe pump 142, and any of the various pumps or selection valves described herein. The program instructions 154, when executing by processor 150, can cause the computing system 148 to control the auto-sampling system 100 (e.g., control the pumps and selection valves) according to one or more modes of operation, as described below.

In some embodiments, a first mode of operation is associated with one or more stock calibration standards, blanks, quality control standards, or samples. In the first mode of operation, selection valve 136 and other fluidically coupled valves regulate fluid flow of the carrier solution from syringe 132 and/or syringe 134 and the matrix solution from syringe 128. In the first mode of operation, the computing system 148 can be configured to select a fluid flow rate of the matrix solution that achieves a pre-set final matrix concentration.

In some embodiments, a second mode is associated with one or more samples containing matrix solution below a pre-set matrix concentration. In the second mode of operation, selection valve 136 and other fluidically coupled valves regulate fluid flow of the carrier solution from syringe 132 and/or syringe 134, the diluent from syringe 130, and the matrix solution from syringe 128. In the second mode of operation, the computing system 148 can be configured to reduce fluid flow of the matrix solution until a (predefined or programmed) threshold matrix concentration is achieved.

In some embodiments, a third mode of operation is associated with one or more undiluted samples containing a pre-set concentration of matrix solution. In the third mode of operation, selection valve 136 and other fluidically coupled valves regulate fluid flow of the carrier solution from syringe 132 and/or syringe 134 and the diluent from syringe 130. In the third mode of operation, the computing system 148 can be configured to cause a selected volume of diluent to be introduced to achieve a pre-set final matrix concentration.

In some embodiments, a fourth mode of operation is associated with one or more samples containing a pre-set concentration of matrix solution, where the one or more samples are diluted inline (causing the sample matrix to also be diluted). In the fourth mode of operation, selection valve 136 and other fluidically coupled valves regulate fluid flow of the carrier solution from syringe 132 and/or syringe 134, the diluent from syringe 130, and the matrix solution from syringe 128. In the fourth mode of operation, the computing system 148 can be configured to reduce the fluid flow of the matrix solution when a (predefined or programmed) threshold matrix concentration is achieved.

In some embodiments, a fifth mode of operation is associated with one or more samples containing matrix solution above a pre-set matrix concentration, where the one or more samples are diluted inline (causing the sample matrix to also be diluted). In the fifth mode of operation, selection valve 136 and other fluidically coupled valves regulate fluid flow of the carrier solution from syringe 132 and/or syringe 134, the diluent from syringe 130, and the matrix solution from syringe 128. In the fifth mode of operation, the computing system 148 can be configured to reduce or stop fluid flow of the matrix solution when a (predefined or programmed) threshold matrix concentration is achieved.

In some embodiments, the system 100 is configured to run samples using either: external automatic inline matrix matching (as described above) with three independent syringes for carrier, diluent, and matrix solutions; or automated method of standard additions with three independent syringes for sample, diluent, and spike solutions. Method of Standard Addition (MSA) is an analytical technique that uses a sample as its own "matrix match." Variable spikes of standard are added to the same volume of sample to create a calibration curve in the true sample matrix. The absolute value of the X-intercept is then calculated to be the concentration of an element in the original sample. MSA is considered as the most accurate type of matrix matching, but it requires that a sample be measured multiple times (unspiked and spiked at various concentrations), which significantly reduces sample throughput and increases cost of analysis. However, MSA provides can be the best option for samples that require the highest level of accuracy and/or do not have a suitable ultrapure external matrix matching solution.

In some embodiments, the system 100 is further configured to run in a sixth mode of operation for MSA matching, where syringe 128 is configured to drive a spike solution in place of the matrix solution. In the sixth mode of operation, selection valve 136 and other fluidically coupled valves regulate fluid flow of the carrier solution from syringe 132 and/or syringe 134, the diluent from syringe 130, and the spike solution from syringe 128. In the sixth mode of operation, the computing system 148 can be configured to control fluid flow from each syringe according to a MSA algorithm.

It should be recognized that the various functions, control operations, processing blocks, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, a mobile computing device, mainframe computing system, workstation, image computer, parallel processor, or any other device known in the art. In general, the term "computing system" is broadly defined to encompass any device having one or more processors, which execute instructions from a carrier medium.

Program instructions implementing functions, control operations, processing blocks, or steps, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. An automatic sampling system, comprising:
    a sampling assembly configured to draw a sample into a mixing path;
    a first syringe configured to drive a carrier solution;
    a second syringe configured to drive a diluent;
    a third syringe configured to drive a matrix solution;
    a plurality of selection valves fluidically coupled with the first, second, and third syringes, the plurality of selection valves being configured to direct fluid flows from the first, second, and third syringes into the mixing path according to one or more modes of operation, the plurality of selection valves configured to manage the fluid flow of at least two of the carrier solution, the diluent, and the matrix solution to match a calibration standard matrix to a sample matrix; and
    a nebulizer fluidically coupled with the mixing path, the nebulizer configured to introduce at least a portion of the sample received from the mixing path into a spray chamber, the spray chamber being fluidically coupled with or forming a portion of a sample analysis instrument.

2. The automatic sampling system of claim 1, further comprising a computing system in communication with at least the sampling assembly and the plurality of selection valves, the computing system being configured to control the sampling assembly and the plurality of selection valves according to the one or more modes of operation.

3. The automatic sampling system of claim 1, wherein the one or more modes of operation include a first mode, the first mode of operation causing fluid flow of the carrier solution from the first syringe and the matrix solution from the third syringe.

4. The automatic sampling system of claim 1, wherein the one or more modes of operation include a second mode associated with at least the sample, the sample containing a first amount of the matrix solution, the second mode of operation causing fluid flow of the carrier solution from the first syringe, the diluent from the second syringe, and the matrix solution from the third syringe.

5. The automatic sampling system of claim 1, wherein the one or more modes of operation include a third mode associated with at least the sample, the sample being an undiluted sample containing a first amount of the matrix solution, the third mode of operation causing fluid flow of the carrier solution from the first syringe and the diluent from the second syringe.

6. The automatic sampling system of claim 1, wherein the one or more modes of operation include a fourth mode associated with at least the sample, the sample containing a first amount of the matrix solution, the sample being diluted inline, the fourth mode of operation causing fluid flow of the carrier solution from the first syringe, the diluent from the second syringe, and the matrix solution from the third syringe.

7. The automatic sampling system of claim 1, wherein the one or more modes of operation include a fifth mode associated with at least the sample, the sample containing a first amount of the matrix solution, the sample being diluted inline, the fifth mode of operation causing fluid flow of the carrier solution from the first syringe, the diluent from the second syringe, and the matrix solution from the third syringe, wherein the fluid flow of the matrix solution is reduced or eliminated when a threshold amount of the matrix is achieved in the sample.

8. An automatic sampling system, comprising: a sampling assembly configured to draw a sample into a mixing path; a first syringe configured to drive a carrier solution; a second syringe configured to drive a diluent; a third syringe configured to selectably drive one of a matrix solution or a spike solution; a plurality of selection valves fluidically coupled with the first, second, and third syringes, the plurality of selection valves being configured to direct fluid flows from the first, second, and third syringes into the mixing path according to one or more modes of operation, the plurality of selection valves configured to manage the fluid flow of at least two of the carrier solution, the diluent, and the one of the matrix solution or the spike solution to match a calibration standard matrix to a sample matrix; and a nebulizer fluidically coupled with the mixing path, the nebulizer configured to introduce at least a portion of the sample received from the mixing path into a spray chamber, the spray chamber being fluidically coupled with or forming a portion of a sample analysis instrument, wherein the one or more modes of operation include a mode of operation causing fluid flow of the carrier solution from the first syringe, the diluent from the second syringe, and the spike solution from the third syringe, wherein the fluid flow from each syringe is controlled according to a method of standard additions algorithm.

* * * * *